(12) United States Patent
Kume et al.

(10) Patent No.: US 11,069,235 B2
(45) Date of Patent: Jul. 20, 2021

(54) COOPERATION METHOD BETWEEN AGENTS AND NON-TRANSITORY STORAGE MEDIUM

(71) Applicant: Toyota Jidosha Kabushiki Kaisha, Toyota (JP)

(72) Inventors: Satoshi Kume, Chofu (JP); Keiji Yamamoto, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 93 days.

(21) Appl. No.: 16/241,236

(22) Filed: Jan. 7, 2019

(65) Prior Publication Data

US 2019/0221118 A1 Jul. 18, 2019

(30) Foreign Application Priority Data

Jan. 18, 2018 (JP) .............................. JP2018-006626

(51) Int. Cl.
*H04W 4/00* (2018.01)
*G08G 1/0965* (2006.01)
*G08G 1/16* (2006.01)
*B60W 50/14* (2020.01)
*G08G 1/0967* (2006.01)

(52) U.S. Cl.
CPC ........... *G08G 1/0965* (2013.01); *B60W 50/14* (2013.01); *G08G 1/161* (2013.01); *G08G 1/162* (2013.01); *G08G 1/167* (2013.01); *G08G 1/096791* (2013.01)

(58) Field of Classification Search
CPC .................................. G08G 1/00; H04W 4/00
See application file for complete search history.

(56) References Cited

U.S. PATENT DOCUMENTS

| | | | |
|---|---|---|---|
| 9,550,528 B1 | 1/2017 | Hakeem et al. | |
| 2003/0028292 A1 | 2/2003 | Ueda | |
| 2005/0256630 A1 | 11/2005 | Nishira et al. | |
| 2014/0244096 A1* | 8/2014 | An ........................ | G05D 1/0055 701/25 |
| 2016/0325753 A1* | 11/2016 | Stein ........................ | G06K 9/46 |
| 2017/0084174 A1 | 3/2017 | Suzuki | |
| 2017/0329337 A1 | 11/2017 | Kusano et al. | |
| 2018/0058873 A1* | 3/2018 | Huang ..................... | G01S 17/86 |
| 2018/0342034 A1* | 11/2018 | Kislovskiy ............. | G06Q 50/30 |
| 2019/0098471 A1* | 3/2019 | Rech ....................... | G08G 1/162 |

FOREIGN PATENT DOCUMENTS

| | | |
|---|---|---|
| DE | 102016205142 A1 | 10/2017 |
| JP | 2003-016584 A | 1/2003 |
| JP | 2003-050786 A | 2/2003 |
| JP | 2005-324727 A | 11/2005 |
| JP | 2012-022565 A | 2/2012 |
| JP | 2015-064733 A | 4/2015 |
| KR | 20100107800 A | 10/2010 |

* cited by examiner

*Primary Examiner* — Shirley Lu
(74) *Attorney, Agent, or Firm* — Dinsmore & Shohl LLP (57) ABSTRACT

A cooperation method between agents includes allowing a first agent installed on a first vehicle and a second agent installed on a second vehicle to cooperate with each other, specifying first information regarding future driving of a first driver aboard the first vehicle, by the first agent, acquiring the first information, by the second agent, and notifying a second driver aboard the second vehicle of first driving assistance information derived based on the first information.

8 Claims, 7 Drawing Sheets

| DRIVER ID | SEX | AGE | OVER-SPEED TENDENCY | CONCESSION TENDENCY | OVERTAKING TENDENCY | ... |
|---|---|---|---|---|---|---|
| 001 | MALE | 40 | 64 | 57 | 55 | |
| 002 | FEMALE | 30 | 4 | 10 | 6 | |

COOPERATION METHOD BETWEEN AGENTS AND NON-TRANSITORY STORAGE MEDIUM

CROSS-REFERENCE TO RELATED APPLICATION

This application claims priority to Japanese Patent Application No. 2018-006626 filed on Jan. 18, 2018, incorporated herein by reference in its entirety.

BACKGROUND

1. Technical Field

The disclosure relates to a cooperation method between agents and a non-transitory storage medium.

2. Description of Related Art

Japanese Unexamined Patent Application Publication No. 2003-016584 (JP 2003-016584 A) discloses an information terminal device that includes host vehicle information acquisition means for acquiring information of a host vehicle, including position information and speed information, transmission means for transmitting the host vehicle information to another vehicle when a predetermined transmitting condition is satisfied, and voice guidance means for performing voice guidance on another vehicle based on position information and speed information of the other vehicle, which are acquired from the other vehicle. The voice guidance means in the information terminal device guides information of the other vehicle to a driver when the inter-vehicle distance between the host vehicle and the other vehicle exceeds a predetermined distance.

SUMMARY

In the technique described in JP 2003-016584 A, by acquiring the position information of the other vehicle, it is possible to inform the driver of information indicating the position of the other vehicle so as not to depart from the other vehicle. However, for example, when overtaking another vehicle or entering the lane where another vehicle travels, the driving assistance for the host vehicle is not performed by cooperation with the other vehicle.

The disclosure provides a cooperation method between agents that offer driving assistance by notifying drivers of information obtained by cooperation between agents and a non-transitory storage medium.

A first aspect of the disclosure relates to a cooperation method between agents. The cooperation method includes allowing a first agent installed on a first vehicle and a second agent installed on a second vehicle to cooperate with each other, specifying first information regarding future driving of a first driver aboard the first vehicle, by the first agent, acquiring the first information, by the second agent, and notifying a second driver aboard the second vehicle of first driving assistance information derived based on the first information.

According to the first aspect of the disclosure, the second driver of the second vehicle can drive using knowledge of the driving assistance information derived based on the first information regarding the future driving of the first driver.

In the cooperation method of the first aspect of the disclosure, the specifying of the first information by the first agent may include estimating, by the first agent, a traveling schedule of the first vehicle from utterances given by the first driver, the acquiring of the first information by the second agent may include acquiring, by the second agent, information regarding the traveling schedule of the first vehicle estimated by the first agent as information regarding the future driving, and the notifying of the second driver of the first driving assistance information may include notifying the second driver of the first driving assistance information derived based on the information regarding the traveling schedule of the first vehicle.

The cooperation method of the first aspect of the disclosure may further include specifying second information regarding future driving of the second driver, by the second agent, acquiring the second information by the first agent, and notifying the first driver of second driving assistance information derived based on the second information.

In the cooperation method of the aspect of the disclosure, the specifying of the information regarding the future driving of the second driver by the second agent may include specifying, by the second agent, response information on a response of the second driver to the first driving assistance information as the information regarding the future driving of the second driver, and the notifying of the first driver of the second driving assistance information may include notifying the first driver of the second driving assistance information derived based on the response information.

A second aspect of the disclosure also relates to a cooperation method between agents. The cooperation method includes allowing a first agent installed on a first vehicle and a second agent installed on a second vehicle to cooperate with each other, specifying information regarding future driving of a first driver aboard the first vehicle, by the first agent, and transmitting the information by the first agent to enable the second agent to acquire the information.

A third aspect of the disclosure also relates to a cooperation method between agents. The cooperation method includes acquiring response information on a response of a second driver to driving assistance information derived based on information regarding a traveling schedule of a first vehicle, as information regarding future driving of the second driver, and notifying a first driver of driving assistance information derived based on the response information.

The cooperation method of the third aspect of the disclosure may further include allowing a first agent installed on the first vehicle and a second agent installed on a second vehicle to cooperate with each other, acquiring first information regarding future driving of the first driver aboard the first vehicle, by the second agent, and notifying the second driver aboard the second vehicle of driving assistance information derived based on the first information.

In the cooperation method of the third aspect of the disclosure, the first information may include the traveling schedule of the first vehicle, and the cooperation method may further include specifying the response information on the response of the second driver to the driving assistance information derived based on the information regarding the traveling schedule of the first vehicle, as second information regarding future driving of the second driver, and transmitting the response information to enable the first agent to acquire the response information.

A fourth aspect of the disclosure relates to a non-transitory storage medium storing information regarding future driving of a first driver aboard a first vehicle. The information regarding future driving of the first driver is specified by a first agent installed on the first vehicle, acquired by a second agent installed on a second vehicle, and used to derive driving assistance information for notifying a second driver aboard the second vehicle.

A fifth aspect of the disclosure also relates to a non-transitory storage medium storing response information on a response of a second driver aboard a second vehicle to driving assistance information derived based on information regarding a traveling schedule of a first vehicle. The response information is specified by a second agent installed on the second vehicle, acquired by a first agent installed on the first vehicle, and used to derive driving assistance information for notifying the second driver.

With the aspects of the disclosure, it is possible to provide a cooperation method between agents that offer driving assistance by notifying drivers of information obtained by cooperation between agents and a non-transitory storage medium.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Figure 1:
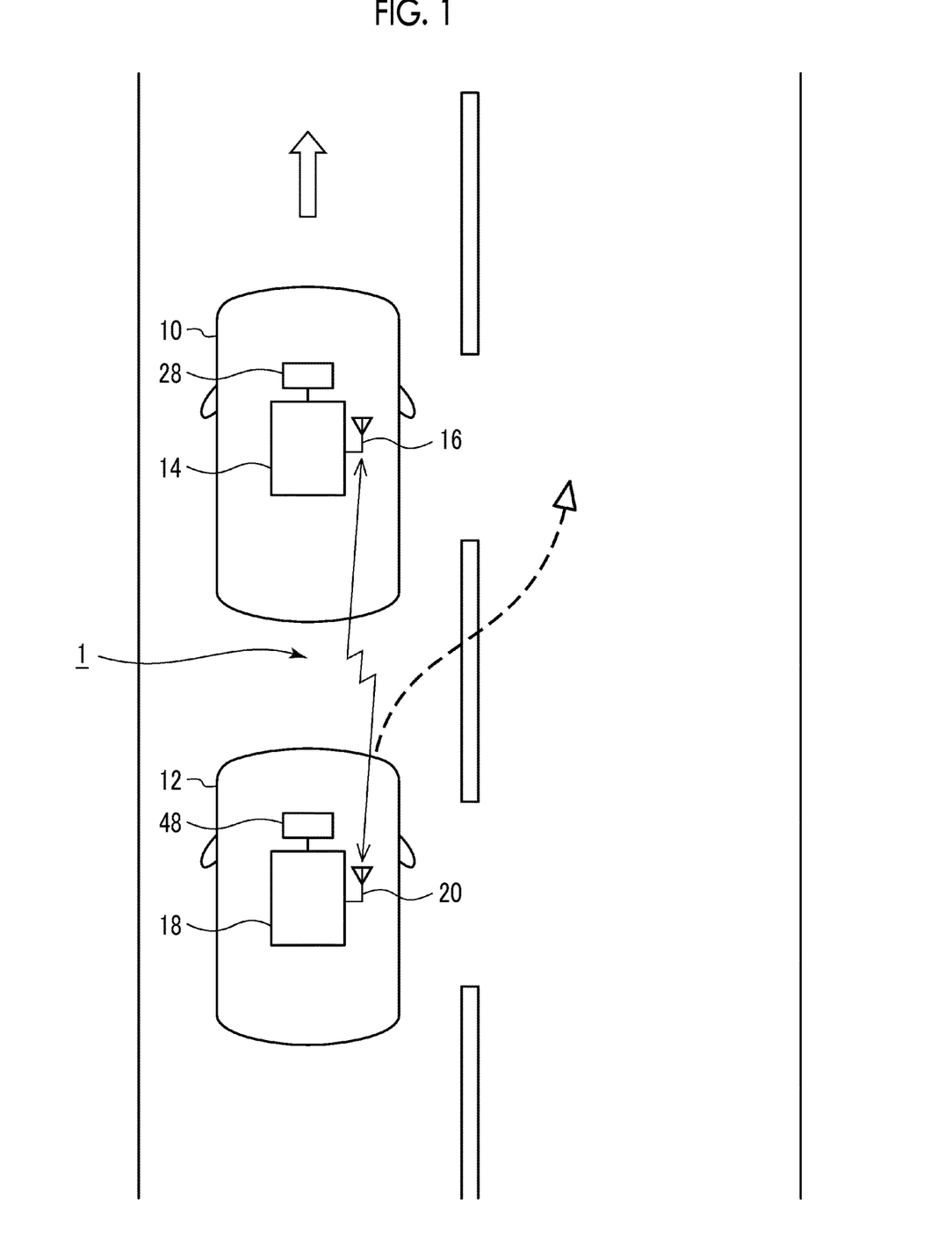
FIG. 1 is a view illustrating an agent cooperation system.
Figure 2A:
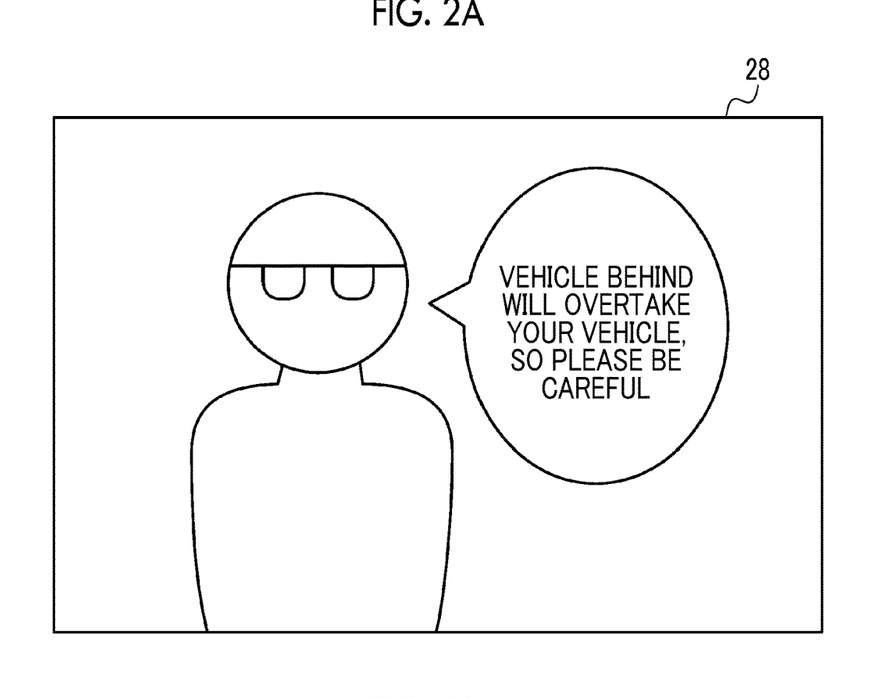
FIG. 2A is a view illustrating an example of information that is transmitted to a driver by an agent when overtaking.
Figure 2B:
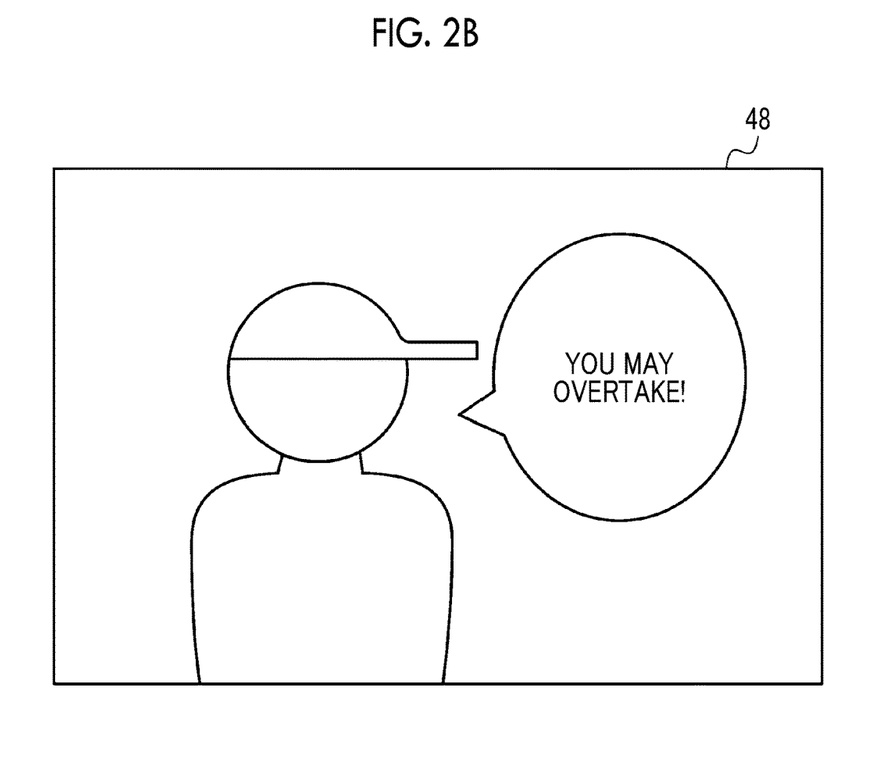
FIG. 2B is a view illustrating an example of information that is transmitted to another driver by another agent when overtaking.

FIG. 1 is a view illustrating an agent cooperation system 1. FIGS. 2A and 2B are views illustrating examples of information that is transmitted to drivers by agents when overtaking.

In the agent cooperation system 1, a first agent 14 installed on a first vehicle 10 and a second agent 18 installed on a second vehicle 12 cooperate with each other to exchange information regarding driving of each vehicle through a first communication unit 16 and a second communication unit 20 and the exchanged information is used for driving assistance. For example, the first agent 14 can notify a first driver aboard the first vehicle 10 of useful driving assistance information by acquiring a traveling schedule of a driving tendency of the second vehicle 12 located in the vicinity of the first vehicle 10, and the second agent 18 can notify a second driver of useful driving assistance information by acquiring a traveling schedule or a driving tendency of the first vehicle 10.

The first agent 14 and the second agent 18 exchange information mainly through dialogue, and assists the driving of the driver by offering information on traveling in at least one of voice and image. The first agent 14 and the second agent 18 may interact with the driver in terms of traveling, but may also make a daily dialogue not related to traveling.

The first communication unit 16 and the second communication unit 20 exchange information regarding driving of the vehicle by at least one of inter-vehicle communication using an infra-red laser or a radio wave or communication through a relay device such as a server device. A vehicle identifier (ID) is assigned to information transmitted by each of the first communication unit 16 and the second communication unit 20.

In a situation shown in FIG. 1, in a case where the second driver aboard the second vehicle 12 utters a content, saying that he/she will overtake the first vehicle 10, when the second agent 18 acquires the utterance, the second agent 18 transmits, to the first agent 14 of the first vehicle 10, information of future driving indicating that the second vehicle 12 is scheduled to overtake the first vehicle 10.

The first agent 14 receives the traveling schedule of the second vehicle 12, and as illustrated in FIG. 2A, the first driver is notified of the driving assistance information for alerting the first driver to the fact that the second vehicle 12 is scheduled to overtake the first vehicle 10 by voice and image by a first transmission device 28. When the first driver utters a content saying that the first driver will permit the second vehicle 12 to overtake the first vehicle 10, in response to the notification from the first agent 14, the first agent 14 transmits, to the second agent 18, information regarding future driving of the first driver indicating the permission of the overtaking, and the second agent 18 notifies the second driver of driving assistance information indicating that the second driver may overtake the first vehicle 10 by voice and image by a second transmission device 48, as illustrated in FIG. 2B.

As an alternative, the first agent 14 receives information indicating that the second vehicle 12 is scheduled to overtake the first vehicle 10 from the second agent 18, and transmits information indicating the driving attribute of the first driver to the second agent 18. When the second agent 18 determines whether or not smooth overtaking can be performed based on the information indicating the driving attribute of the first driver, if the determination is positive, the second agent 18 notifies the second driver of the driving assistance information indicating that the second driver may overtake the first vehicle 10 by voice and image by the second transmission device 48, as illustrated in FIG. 2B.

The first driver can receive the notification of the driving assistance information indicating the traveling schedule of the second vehicle 12, according to which the first driver can drive carefully so as not to change the lane or increase vehicle speed. The second driver can receive the notification of the driving assistance information based on information of future driving of the first vehicle 10, and perform smooth overtaking. In this way, by cooperating between agents, it is possible to provide driving assistance of the driver.

Figure 3:
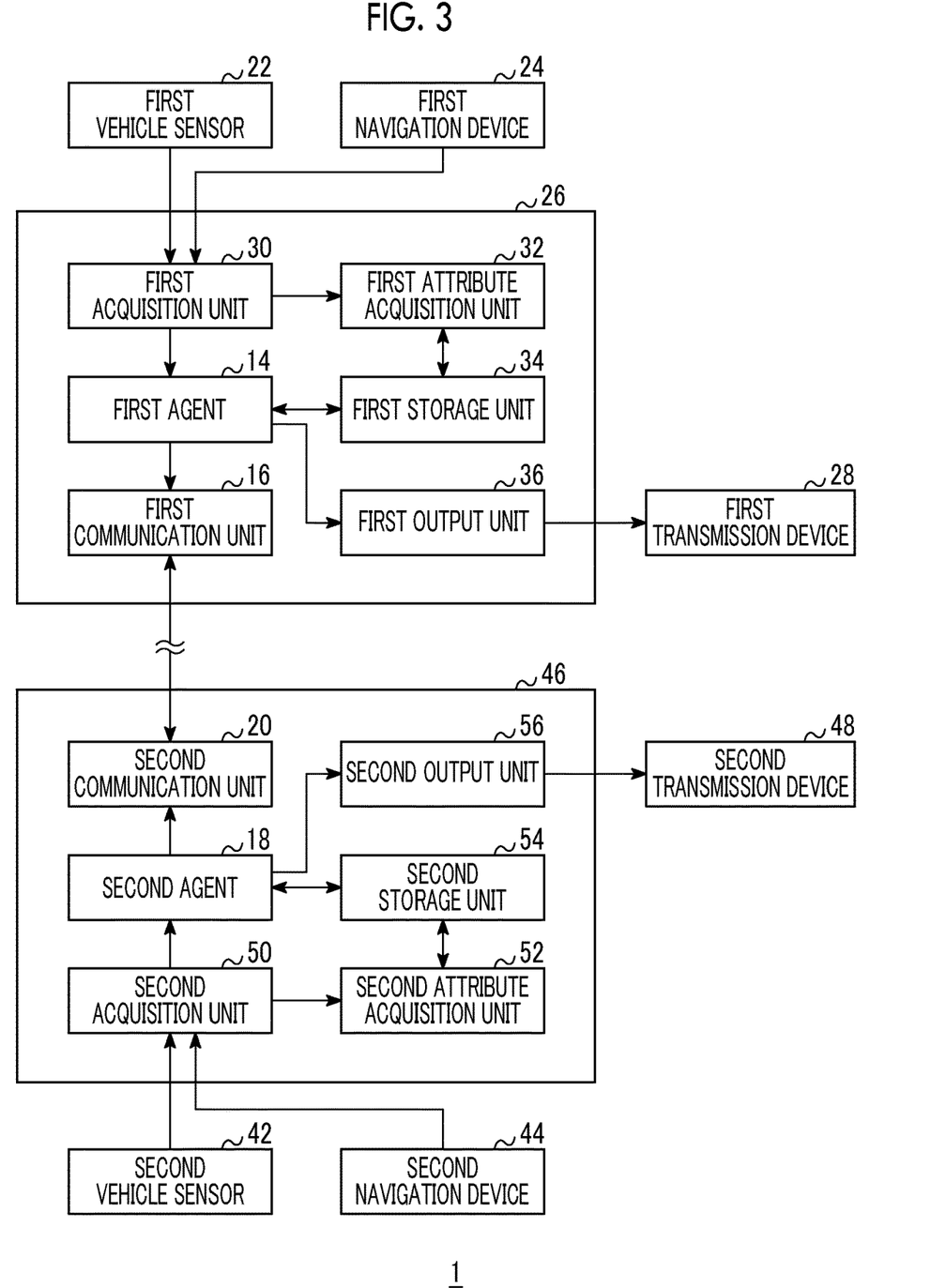
FIG. 3 is a block diagram illustrating a functional configuration of the agent cooperation system.

FIG. 3 is a block diagram illustrating a functional configuration of the agent cooperation system 1. In FIG. 3, each element, which is described as a functional block performing various processes, may be constituted by including a circuit block, a memory, other large scale integration (LSI), or the like in terms of hardware, and may be implemented by a program loaded in the memory, or the like, in terms of software. Therefore, it is to be understood by those skilled in the art that the functional blocks are implemented in various forms, by hardware only, by software only, or in combination with hardware and software, and the disclosure is not limited to any one of those described above.

The first vehicle 10 is provided with a first vehicle sensor 22, a first navigation device 24, a first electronic controller 26 and the first transmission device 28. The first vehicle sensor 22 includes various sensors provided in the first vehicle 10, such as a sensor for detecting an external environment, a sensor for detecting a traveling circumstance, a microphone for collecting the utterance given by the driver, and the like.

The sensor for detecting the external environment can include a camera for imaging the vicinity of the vehicle, a radar or laser for detecting objects in the vicinity of the vehicle, or the like, and according to the detecting result, position information of another vehicle in the vicinity of the vehicle can be acquired. The sensor for detecting the traveling circumstance can include a sensor for detecting the vehicle speed, a sensor for detecting the acceleration, a sensor for detecting a steering operation amount, a sensor for measuring a braking operation amount, or the like, and according to the detecting result, the traveling result of the vehicle can be acquired to determine the driving tendency of the driver. The information acquired by the first vehicle sensor 22 is transmitted to the first electronic controller 26.

The first navigation device 24 acquires information indicating a destination set for the driver and position information of the first vehicle 10, and transmits the destination information and the position information to the first electronic controller 26. The first transmission device 28 includes a display and a speaker, and transmits information to the driver under the control of the first electronic controller 26.

The first electronic controller 26 includes the first agent 14, the first communication unit 16, a first acquisition unit 30, a first attribute acquisition unit 32, a first storage unit 34 and a first output unit 36. The first acquisition unit 30 acquires the external environment information, the traveling circumstance information, the utterance information, the destination information and the position information from the first vehicle sensor 22 and the first navigation device 24.

The first attribute acquisition unit 32 acquires a driving tendency of the driver based on the traveling circumstance information acquired by the first acquisition unit 30. The first attribute acquisition unit 32 classifies the driving of the driver into a plurality of stages, such as gentle driving and rough driving, based on the traveling circumstance information indicating the past driving history, and stores the information indicating the gentle driving, into which the driving of the driver is classified, as the driving tendency of the driver in the first storage unit 34.

The first storage unit 34 stores personal information indicating the driver's sex and age as the information regarding the driving attribute of the driver, together with the information indicating the driving tendency of the driver. The information regarding the driving attribute of the driver includes attribute information of the driver and information indicating the driving tendency. In addition, the first storage unit 34 stores map information.

The first output unit 36 generates audio signals and image signals to be transmitted to the first transmission device 28 according to the determination of the first agent 14, transmits the generated information to the first transmission device 28, and offers the information to the driver.

The first agent 14 uses the external environment information acquired by the first acquisition unit 30, the traveling circumstance information, the utterance information, destination information and the position information, and the information regarding the driving attribute of the driver stored in the first storage unit 34 to offer information for driving assistance by cooperation with the second agent 18 of the second vehicle 12.

The second vehicle 12 is provided with a second vehicle sensor 42, a second navigation device 44, a second electronic controller 46 and a second transmission device 48, and the second electronic controller 46 includes the second agent 18, the second communication unit 20, a second acquisition unit 50, a second attribute acquisition unit 52, a second storage unit 54 and a second output unit 56. Each function provided in the second vehicle 12 is the same as that in the first vehicle 10, and thus the description thereof will not be repeated.

Figure 4:
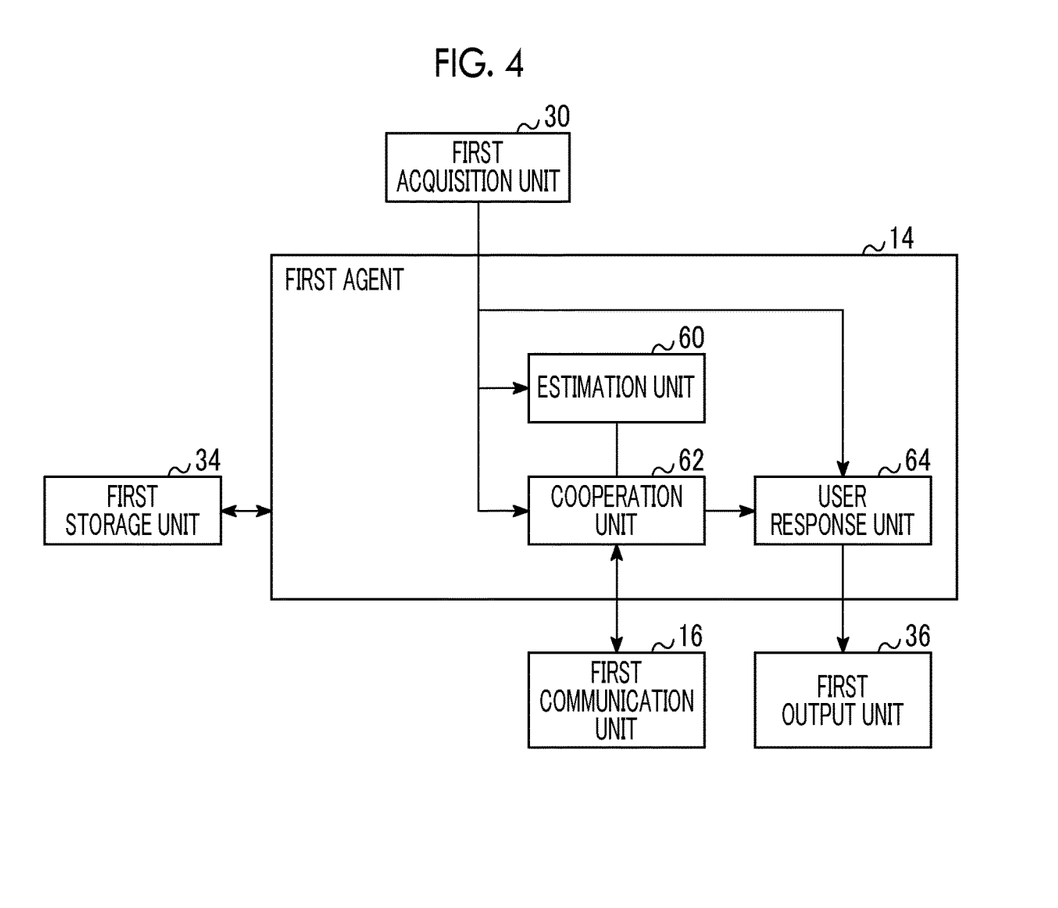
FIG. 4 is a block diagram illustrating a function configuration of a first agent.

FIG. 4 is a block diagram illustrating a function configuration of the first agent 14. The first agent 14 includes an estimation unit 60, a cooperation unit 62 and a user response unit 64.

The user response unit 64 implements communication with the driver by recognizing the utterance given by the first driver and responding to the utterance. The user response unit 64 outputs not only a response to the utterance given by the first driver, but also the audio prompting the utterance by the first driver, and offers the driving assistance information to the first driver. For example, the user response unit 64 outputs the audio saying "where are you going?", prompts the first driver to give utterance to the destination, and outputs the audio saying "please drive at a reduced speed" based on speed information of the vehicle for driving assistance.

The user response unit 64 updates the information regarding the driving attribute of the first driver based on the utterance given by the first driver. The user response unit 64 specifies the sex, the age and the temper of the first driver from the utterance given by the first driver and stores them as the driving attribute of the first driver in the first storage unit 34. Interpreting the utterance given by the first driver makes it possible to acquire the information regarding the driving attribute of the first driver other than driving data.

A plurality of types of information regarding the driving attribute of the driver may be provided, and may include, for example, parameters related to the vehicle speed, parameters related to course concession, parameters related to overtaking, or the like.

Figure 5:
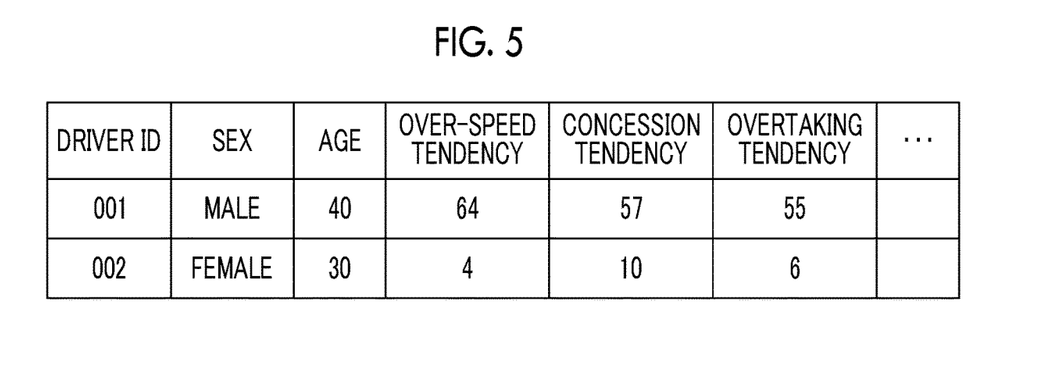
FIG. 5 is a table showing information regarding a driving attribute of the driver.

FIG. 5 is a table showing the information regarding the driving attribute of the driver. The first storage unit 34 stores the sex, the age, parameters related to over-speed, parameters related to course concession, parameters related to overtaking or the like in association with the driver ID. The parameter related to over-speed is set by the frequency of over-speed and the vehicle speed when traveling at the over-speed. The parameter related to course concession is set by the number of times of allowing other vehicles to cut in front of the host vehicle from the other lane, and the number of times of not allowing other vehicles to cut in front of the host vehicle from the other lane. The parameter related to overtaking is set by the rotation for overtaking. The information regarding the driving attribute of the driver includes parameters indicating a plurality of types of driving tendencies, and the parameters are used to derive driving assistance information. Setting a plurality of types of driving tendencies makes the agent possible to accurately predict the behavior of the driver according to the traveling circumstance and provide appropriate driving assistance information.

In the example shown in FIG. 5, the first vehicle 10 is used by a plurality of drivers, such as family members, and the information regarding the driving attribute is stored for each driver. The types of parameters are represented by a numerical value from zero to 100, and the higher the numerical value is, the more the driving tends to be rough. The driver on the upper part in FIG. 5 shows that the driver has a rougher driving tendency than that of driver in the lower part, drives at an over-speed easily, hardly makes course concession, and has fewer overtaken numbers.

The information regarding the driving attribute of the first driver may be derived based on the driving assistance information provided by the first agent 14 and the utterances and driving results of the first driver who receives the driving assistance information. For example, when the first agent 14 provides the driving assistance information saying "a vehicle is approaching from the right" to the first driver, the driver utters a content saying that the first driver will not allow another vehicle to cut in front of the host vehicle, and when the driver does not allow another vehicle to cut in front of the host vehicle, the first attribute acquisition unit 32 updates the parameter related to course concession to be high. In contrast, when the first driver drives so that another vehicle can cut in front of the host vehicle, the first attribute acquisition unit 32 updates the parameter related to course concession to be low. In this way, the first agent 14 updates each parameter indicating the driving tendency according to the behavior of the first driver with respect to the driving assistance information provided from the first agent 14, for example, the response of the first driver to the driving assistance information or the driving result of the first driver for the driving assistance information.

Returning to FIG. 4, the estimation unit 60 acquires destination information from the utterance given by the first driver, and estimates the traveling schedule of the first vehicle 10 from the destination information and the map information stored in the first storage unit 34. The estimation unit 60 can acquire the destination information that has not been set in the first navigation device 24 from the utterance given by the first driver. The estimation unit 60 estimates the traveling lane based on a road on which the first vehicle 10 is scheduled to travel and a route scheduled to turn right or left from the acquired destination information. Further, the estimation unit 60 acquires the destination information from the first navigation device 24, and estimates the driving schedule of the first vehicle 10 from the destination information and the map information.

The estimation unit 60 acquires the information regarding the driving attribute of the first driver from the first storage unit 34, and estimates the traveling schedule of the first vehicle 10 based on the information regarding the driving attribute of the first driver. For example, the estimation unit 60 estimates that gentle traveling is continuously performed on the left lane of an expressway road, when the driving tendency of the driver is gentle, and estimates that fast traveling is performed on the right lane of the expressway and estimates the traveling lane and the timing of lane change based on the driving attribute, when the driving tendency of the driver is rough.

Further, the estimation unit 60 estimates whether or not the driving permitting the cutting or overtaking of another vehicle is performed based on the information regarding the driving attribute of the first driver. For example, the estimation unit 60 estimates that driving that permits the cutting by another vehicle at the time of slow traveling is performed, when the driving tendency of the driver is gentle, and estimates that driving that permits the cutting by another vehicle at the time of slow traveling is not performed, when the driving tendency of the driver is rough.

The cooperation unit 62 specifies the information regarding future driving of the first driver aboard the first vehicle 10, and transmits the specified information regarding the future driving to the second agent 18. The information regarding the future driving of the first driver includes information on the traveling schedule that is estimated by the estimation unit 60 and information on the utterance acquired by the user response unit 64, and includes information regarding driving in the future. These pieces of information may be stored in the first storage unit 34. In addition, the information regarding the future driving of the first driver informs the traveling schedule of the first driver of vehicles in the vicinity of at least one of the first vehicle 10 and the second vehicle 12. Vehicles in the vicinity of at least one of the first vehicle 10 and the second vehicle 12 may be within the range detectable by at least one of the first vehicle sensor 22 or the second vehicle sensor 42. That is, the information regarding the future driving is not the traveling schedule in the distant future such as the destination information, and may be the traveling schedule of the host vehicle, the traveling schedule being involved in traveling of another vehicle positioned in the vicinity of the host vehicle and in the near future such as "Now, overtake" and "change the lane from now".

The information regarding the future driving estimated by the estimation unit 60 includes information estimated from the driving attribute of the first driver, information on the traveling schedule estimated from the utterance given by the first driver, and information on the traveling schedule estimated from the destination information set in the first navigation device 24. The information regarding the future driving acquired by the user response unit 64 includes information regarding driving of which the first driver is notified, information regarding driving of which is scheduled to notify the first driver, and information regarding driving approved by the first driver. These pieces of information may be stored in the first storage unit 34.

The cooperation unit 62 derives the driving assistance information based on information regarding the traveling schedule of the second vehicle 12 acquired by cooperation with the second agent 18, and notifies the first driver of driving assistance information having the content of alerting to overtaking, as illustrated in FIG. 2A, or driving assistance information having the content of prompting overtaking, as illustrated in FIG. 2B.

The first communication unit 16 transmits, to the second communication unit 20, the information regarding the driving attribute of the first driver and the information regarding the future driving, and receives, from the second communication unit 20, the information regarding the driving attribute of the second driver and the information regarding the future driving.

Figure 6:
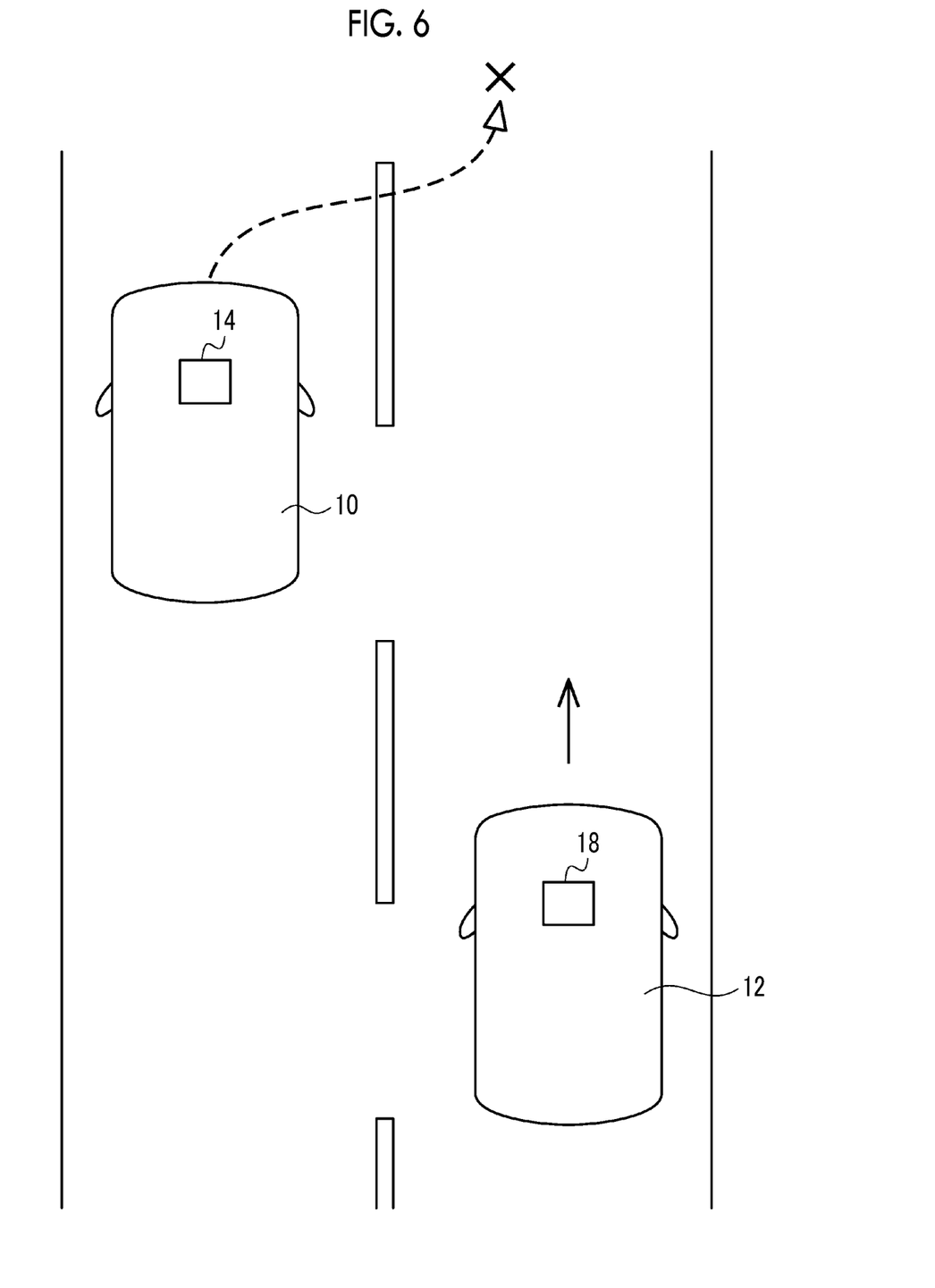
FIG. 6 is a view illustrating an example of driving assistance based on information regarding the driving attribute of the driver acquired by cooperation between agents.

FIG. 6 is a view illustrating an example of driving assistance based on information regarding the driving attribute of the driver acquired by cooperation between agents. The first agent 14 acquires the utterance given by the first driver, containing the content that the first driver will change the lane acquires information of the second vehicle 12 located in the vicinity of the first vehicle 10 from the detecting result of the first vehicle sensor 22, and begins to cooperate with the second agent 18. The first agent 14 may acquire the position information of the second vehicle 12 through the server device.

The second agent 18 transmits, to the first agent 14, information indicating that the driver is young and the driving tendency is rough as information regarding the driving attribute of the second driver, and the first agent 14 generates the driving assistance information based on the information regarding the driving attribute of the second driver. The first agent 14 determines, from the driving attribute of the second driver, that it is not good to change the lane to cut in front of the second vehicle 12, generates the driving assistance information recommending not to change the lane to cut in front of the second vehicle 12 and notifies the first driver of the generated driving assistance information. In this manner, the first agent 14 can perform driving assistance by alerting the first driver based on the driving attribute of the second driver.

In the traveling circumstance illustrated in FIG. 6, when the tendency of the second driver is gentle, the first agent 14 determines that the first vehicle 10 may change the lane, and notifies the first driver of the driving assistance information indicating that lane change may be performed.

Figure 7:
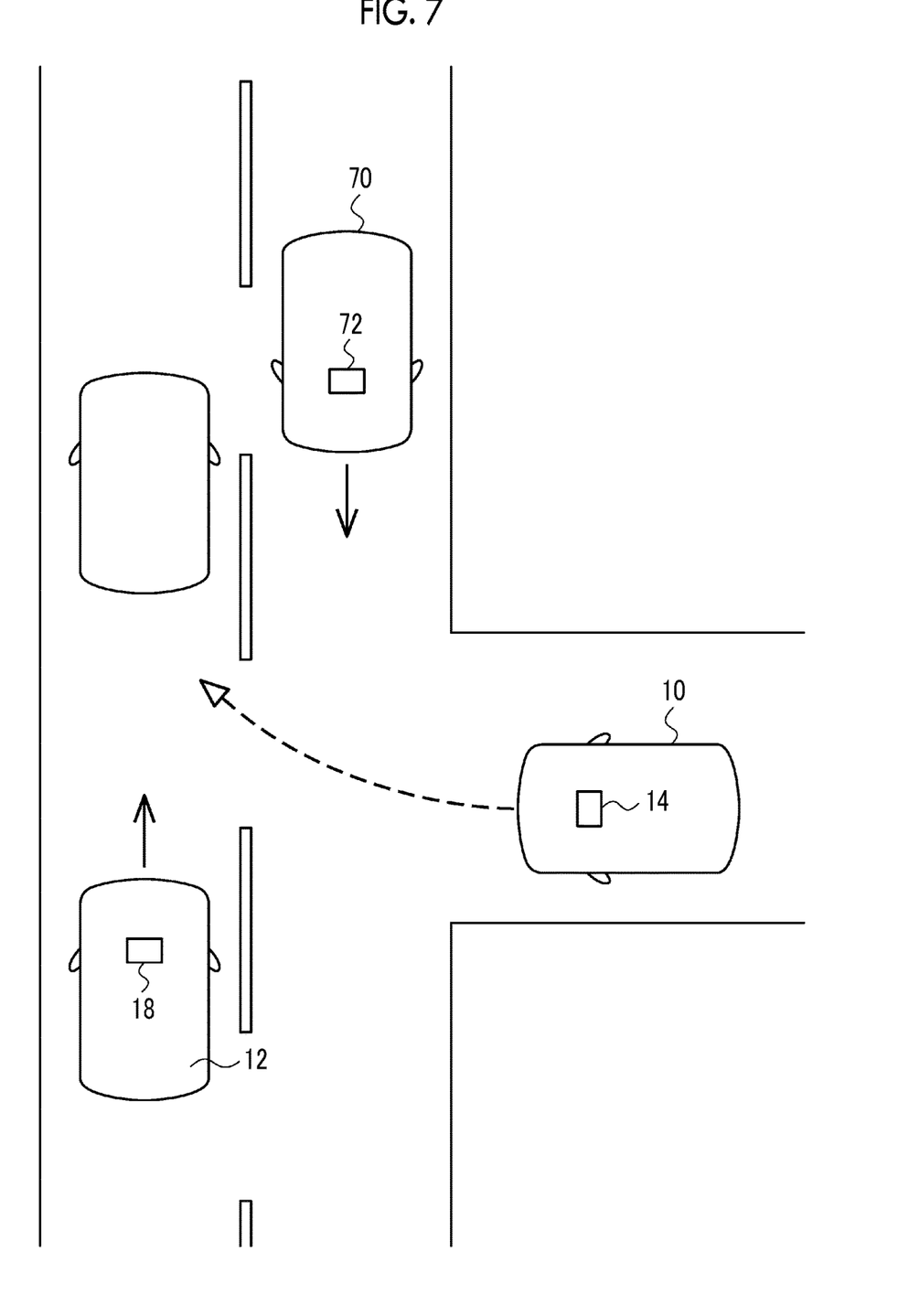
FIG. 7 is a view illustrating an example of driving assistance based on information regarding future driving of the driver acquired by cooperation between agents.

FIG. 7 is a view illustrating an example of driving assistance based on information regarding future driving of the driver acquired by cooperation between agents. The first vehicle 10 is going to turn right on the T shaped road, and the first agent 14 acquires position information of the second vehicle 12 and a third vehicle 70 from the detecting result of the first vehicle sensor 22.

The first agent 14 estimates that the first vehicle 10 is scheduled to turn right from the utterance given by the first driver, and transmits, to the second agent 18 and a third agent 72, information indicating that the first vehicle 10 is scheduled to turn right as the information regarding the future driving.

The second agent 18 and the third agent 72 notify respective drivers of the fact that the first vehicle 10 is scheduled to turn right. In response to the notification, the second driver utters that the first vehicle 10 may cut in front of the second vehicle 12, and the third driver utters that the first vehicle 10 may pass first. The second agent 18 transmits, to the first agent 14, information indicating that he/she permits the right turn of the first vehicle 10 and thus the second vehicle 12 temporarily stops as the information regarding the future driving based on the utterance given by the second driver, and the third agent 72 transmits, to the first agent 14, information indicating that he/she permits the right turn of the first vehicle 10 and the third vehicle 70 temporarily stops as the information regarding the future driving, based on the utterance given by the third driver.

The first agent 14 receives the information regarding the traveling schedules of the second vehicle 12 and the third vehicle 70, generates the driving assistance information indicating that the first vehicle 10 may immediately turn right, and notifies the first driver of the generated driving assistance information. The first driver views the driving assistance information from the first agent 14 to drive to turn right, and moves the first vehicle 10 in front of the second vehicle 12. In this way, the traveling schedules of the drivers and the information confirmed by the drivers can be exchanged between agents, and the driver of each vehicle can be notified of information regarding the future driving of other vehicles present in the vicinity thereof, which makes it possible to assist in driving. Here, the information presented by the agent and confirmed by the driver is used to generate the driving tendency of the driver.

Figure 8:
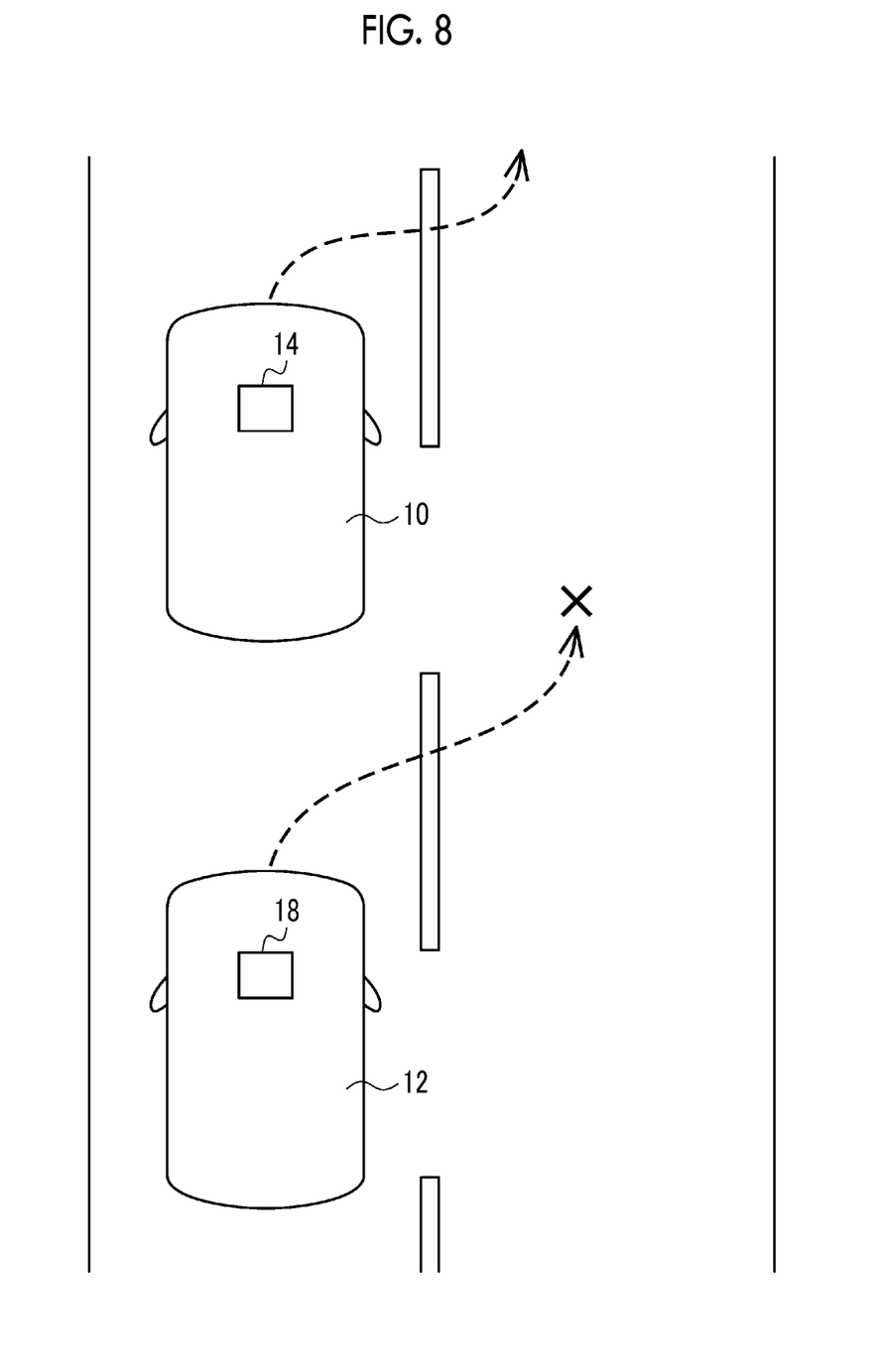
FIG. 8 is a view illustrating an example of driving assistance based on information regarding the driving attribute of the driver and information regarding future driving of the driver, which are acquired by cooperation between agents.

FIG. 8 is a view illustrating an example of driving assistance based on information regarding the driving attribute of the driver and information regarding future driving of the driver, which are acquired by cooperation between agents. The second agent 18 acquires position information of the first vehicle 10 from the detecting result of the second vehicle sensor 42, and cooperates with the first agent 14.

The first agent 14 acquires the traveling schedule of the first driver that the first vehicle 10 is going to change the lane to the right, acquires the information regarding the driving attribute of the first driver, that is, the information indicating that the driver is in his/her 60's and has a gentle driving tendency, and estimates that the first driver changes the lane earlier than the normal driver. The first agent 14 transmits, to the second agent 18, the information regarding future driving, that is, information indicating that the first driver is scheduled to change the lane. Here, the first agent 14 is described as estimating the future driving of the first driver from the driving attribute and the traveling schedule of the first driver, but the disclosure is not limited thereto, and the second agent 18 may estimate the future driving of the first driver by receiving the driving attribute and the traveling schedule of the first driver.

The second agent 18 notifies the second driver so as not to make overtaking based on the traveling schedule of the first driver. In this way, the second driver can drive carefully so as not to overtake the first vehicle 10.

It is understood by those skilled in the art that the embodiment is merely an example, that various modifications can be made by combinations of respective constituent elements, and that the modifications fall within the scope of the disclosure.

Although the first agent 14 and the second agent 18 provide driving assistance of the driver by notifying the driver of the driving assistance information in the embodiment, the embodiment is not limited thereto. For example, at least one of the first vehicle 10 and the second vehicle 12 may perform autonomous driving control, and the information regarding future driving of another vehicle acquired by cooperation between the first agent 14 and the second agent 18 may be used for autonomous driving control of the host vehicle.

The autonomous driving control means performs controls of turning the first vehicle 10 shown in FIG. 7, by way of example, and causing the second vehicle 12 to be stopped temporarily based on the information regarding the future driving of the other vehicle acquired by cooperation between agents. In this way, the information regarding the future driving of the other vehicle acquired by cooperation between agents is used for autonomous driving control, which makes safe control possible by using knowledge of the traveling schedule of the other vehicle.

What is claimed is:

1. A cooperation method between vehicles, the cooperation method comprising:
   allowing a first electronic controller installed on a first vehicle and a second electronic controller installed on a second vehicle to cooperate with each other;
   specifying first information regarding future driving of a first driver aboard the first vehicle, by the first electronic controller;
   transmitting the first information from the first electronic controller to the second electronic controller;
   notifying, by voice and image, a second driver aboard the second vehicle of first driving assistance information derived based on the first information;

wherein the specifying of the first information includes estimating, by the first electronic controller, a traveling schedule of the first vehicle based on utterances given by the first driver and based on one or more driving attributes of the first driver, the driving attributes of the first driver comprise at least an over-speed tendency, a concession tendency, and an overtaking tendency;

wherein the first information comprises the traveling schedule of the first vehicle estimated by the first electronic controller; and wherein the notifying of the second driver of the first driving assistance information includes notifying the second driver of the first driving assistance information derived based on the traveling schedule of the first vehicle.

2. The cooperation method according to claim 1, further comprising:

specifying second information regarding future driving of the second driver, by the second electronic controller;

transmitting the second information from the second electronic controller to the first electronic controller; and notifying the first driver of second driving assistance information derived based on the second information.

3. The cooperation method according to claim 2, wherein:

the specifying of the information regarding the future driving of the second driver by the second electronic controller includes specifying, by the second electronic controller, response information on a response of the second driver to the first driving assistance information as the information regarding the future driving of the second driver; and the notifying of the first driver of the second driving assistance information includes notifying the first driver of the second driving assistance information derived based on the response information.

4. A cooperation method between vehicles, the cooperation method comprising:

allowing a first electronic controller installed on a first vehicle and a second electronic controller installed on a second vehicle to cooperate with each other;

specifying information regarding future driving of a first driver aboard the first vehicle, by the first electronic controller;

transmitting the information by the first electronic controller to enable the second electronic controller to acquire the information;

notifying, by voice and image, a second driver aboard the second vehicle of first driving assistance information derived based on the information;

wherein the information regarding future driving of the first driver comprises a traveling schedule of the first vehicle estimated based on utterances given by the first driver and based on one or more driving attributes of the first driver, the driving attributes of the first driver comprise at least an over-speed tendency, a concession tendency, and an overtaking tendency.

5. A cooperation method between vehicles, the cooperation method comprising:

allowing a first electronic controller installed on a first vehicle and a second electronic controller installed on a second vehicle to cooperate with each other;

acquiring first information regarding future driving of the first driver aboard the first vehicle, by the second electronic controller;

transmitting the first information from the first electronic controller to the second electronic controller;

notifying, by voice and image, the second driver aboard the second vehicle of driving assistance information derived based on the first information;

acquiring response information on a response of a second driver in a second vehicle to driving assistance information derived based on information regarding a traveling schedule of a first vehicle, as information regarding future driving of the second driver;

transmitting the response information from the second vehicle to the first vehicle; and notifying a first driver in a first vehicle of driving assistance information derived based on the response information;

wherein the information regarding the traveling schedule of the first vehicle is estimated based on utterances given by the first driver and based on one or more driving attributes of the first driver, the driving attributes of the first driver comprise at least an over-speed tendency, a concession tendency, and an overtaking tendency.

6. The cooperation method according to claim 5, further comprising:

specifying the response information on a response of the second driver to the driving assistance information derived based on the information regarding the traveling schedule of the first vehicle, the first information including the traveling schedule of the first vehicle, as second information regarding future driving of the second driver; and transmitting the response information to enable the first electronic controller to acquire the response information.

7. A non-transitory storage medium storing information regarding future driving of a first driver aboard a first vehicle, wherein the information regarding the future driving of the first driver is specified by a first electronic controller installed on the first vehicle, transmitted from the first electronic controller to a second electronic controller installed on a second vehicle, and used to derive driving assistance information for notifying, by voice and image, a second driver aboard the second vehicle;

wherein the information regarding future driving of the first driver comprises a traveling schedule of the first vehicle estimated based on utterances given by the first driver and based on one or more driving attributes of the first driver, the driving attributes of the first driver comprise at least an over-speed tendency, a concession tendency, and an overtaking tendency.

8. A non-transitory storage medium storing response information on a response of a second driver aboard a second vehicle to driving assistance information derived based on information regarding a traveling schedule of a first vehicle, wherein the response information is specified by a second electronic controller installed on the second vehicle, transmitted from the second electronic controller to a first electronic controller installed on the first vehicle, and used to derive driving assistance information for notifying, by voice and image, the second driver; and wherein the traveling schedule of the first vehicle is estimated by the first electronic controller based on utterances given by a first driver of the first vehicle and based on one or more driving attributes of the first driver, the driving attributes of the first driver comprise at least an over-speed tendency, a concession tendency, and an overtaking tendency.

* * * * *